No. 856,872. PATENTED JUNE 11, 1907.
N. HORON.
BEER TAP REGISTER.
APPLICATION FILED JAN. 28, 1907.

2 SHEETS—SHEET 1.

WITNESSES:

Nicholas Horon,
INVENTOR

By C. A. Snow & Co.
ATTORNEYS

No. 856,872. PATENTED JUNE 11, 1907.
N. HORON.
BEER TAP REGISTER.
APPLICATION FILED JAN. 28, 1907.

2 SHEETS—SHEET 2.

WITNESSES:

Nicholas Horon,
INVENTOR.

By C. A. Snow & Co.
ATTORNEYS

UNITED STATES PATENT OFFICE.

NICHOLAS HORON, OF PEN ARGYL, PENNSYLVANIA.

BEER-TAP REGISTER.

No. 856,872.　　　Specification of Letters Patent.　　　Patented June 11, 1907.

Application filed January 28, 1907. Serial No. 354,551.

*To all whom it may concern:*

Be it known that I, NICHOLAS HORON, a citizen of the United States, residing at Pen Argyl, in the county of Northampton and State of Pennsylvania, have invented a new and useful Beer-Tap Register, of which the following is a specification.

This invention relates to measuring faucets of that general class particularly de10 signed for use in dispensing beer and other liquids and has for its object to provide a faucet by means of which pre-determined quantities of liquid may be withdrawn from a keg or other containing receptacle and an accurate account kept thereof.

A further object is to provide a measuring faucet including a casing having a valve mounted for rotation therein and provided with an operating handle extending through the walls of the casing, said handle being arranged in the path of movement of suitable registering mechanism whereby when the handle is operated to discharge the contents of the faucet the lever will actuate the registering mechanism to indicate the amount of liquid withdrawn.

A still further object of the invention is to generally improve this class of devices so as to increase their utility, durability and efficiency.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

Figure 1:
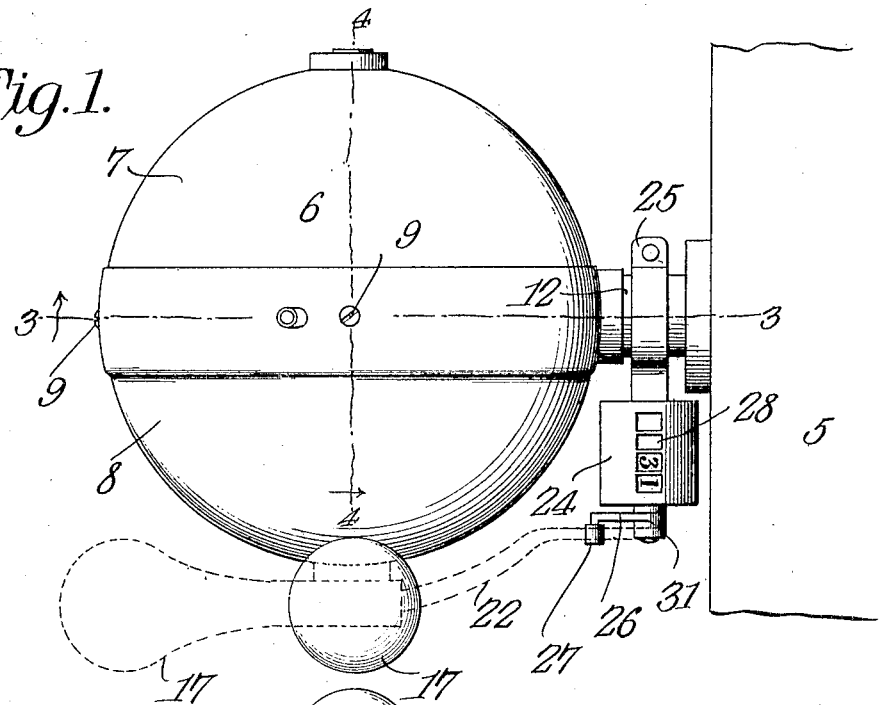
Figure 2:
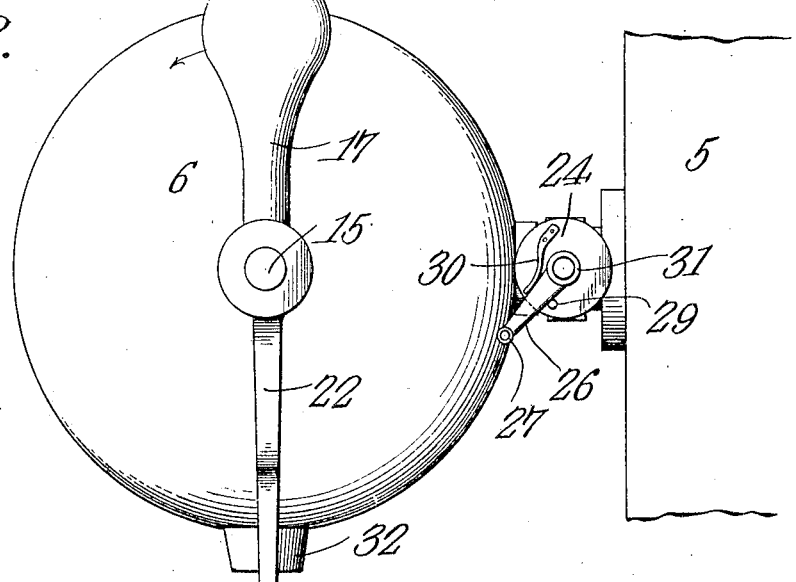
Figure 3:
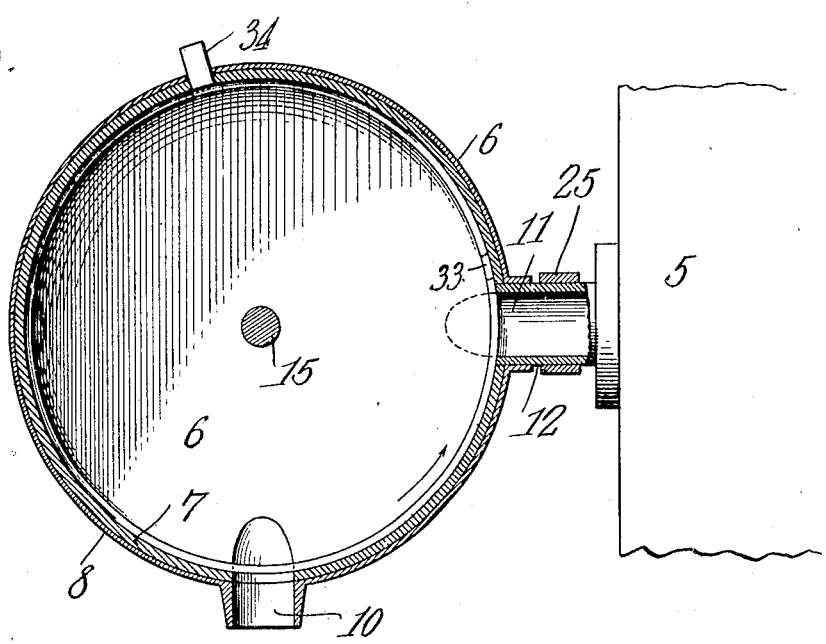
Figure 4:
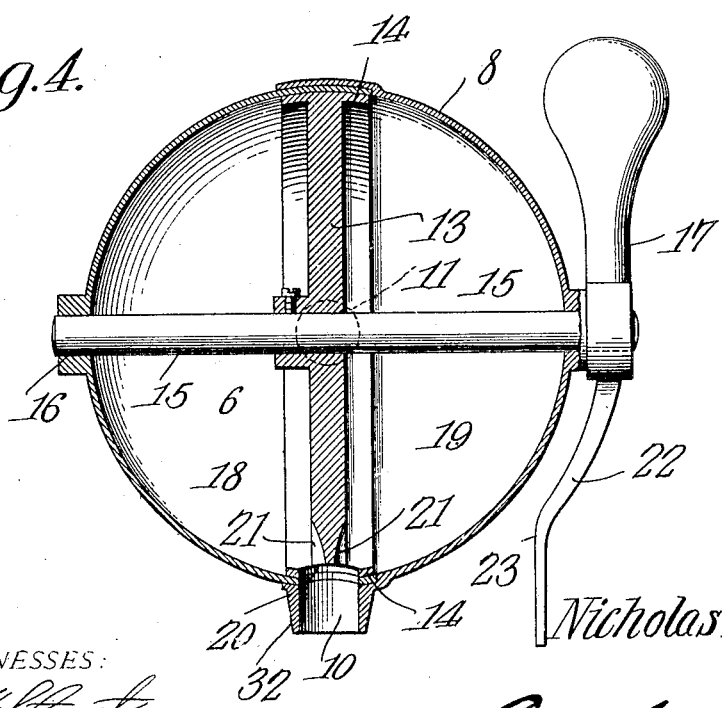

In the accompanying drawings forming a part of this specification: Figure 1 is a top plan view of a registering faucet constructed in accordance with my invention. Fig. 2 is a side elevation of the same. Fig. 3 is a vertical sectional view taken on the line 3—3 of Fig. 1. Fig. 4 is a transverse sectional view taken on the line 4—4 of Fig. 1.

Similar numerals of reference indicate corresponding parts in all of the figures of the drawings.

The improved device is principally designed for dispensing beer and other liquids from a keg or similar containing vessel and by way of illustration is shown applied to a con55 taining vessel of the ordinary construction in which 5 designates the containing vessel and 6 the faucet. The faucet consists of a casing or housing preferably circular in shape, as shown and formed in two sections 7 and 8 having their adjacent ends overlapped and detachably secured together in any suitable manner as by screws or similar fastening devices 9. The casing is provided with a discharge port 10 and an intake port 11, there being a reduced neck or coupling 12 disposed at the intake port 11 for connection with the containing vessel, as shown.

Mounted for rotation within the casing or housing is a transverse partition 13 provided with a peripheral flange 14 which bears against the interior walls of section 7 of the casing and constitutes a valve for regulating the amount of liquid admitted to or withdrawn from the containing vessel. The valve is keyed or otherwise rigidly secured to a transverse shaft 15 mounted for rotation in suitable bearings 16 preferably formed integral with the sections 7 and 8, and secured to one end of the shaft 15 is an operating handle 17 by means of which the valve may be manually operated. The disk or partition 13 divides the interior of the casing into two liquid containing compartments 18 and 19 the combined capacity of which is equal to one glass of beer so that a single glass of beer may be withdrawn from the containing vessel 5 at each operation of the handle 17.

Formed in the peripheral flange 14 of the disk or partition 13 is an opening 20 adapted to successively register with the ports 10 and 11, the opposite faces of the partition 13 at the port 20 being inclined or beveled, as indicated at 21 thereby to permit the liquid to enter the compartments 18 and 19 of the casing when the opening 20 registers with the intake port 11 and also to permit the liquid to be discharged from said compartments when the opening 20 registers with the discharge port 10.

The operating handle 17 is provided with a longitudinal extension or arm 22 the free end of which is bent laterally at 23 and arranged in the path of suitable registering mechanism, indicated at 24. The registering mechanism which may be of any approved construction is detachably secured to the neck or coupling member 12 by a pair of spring arms or clips 25, said registering mechanism including an operating crank 26 having its free end bent laterally and provided with an anti-friction roller 27 which roller is arranged in the path of movement of the arm 22 of the operating handle so that when the handle is operated to open the intake port 11 the arm 22 will engage the roller 27 and thereby indicate on the dial 28 that one glass of beer has been withdrawn from the keg or containing vessel.

A suitable stop lug 29 is preferably secured to the register 24 for limiting the downward movement of the crank arm 26, there being a spring 30 secured to the casing of the registering mechanism for automatically returning the crank arm to normal position after each registering operation. Attention is here called to the fact that the movement of the operating handle as well as the movement of the valve 13 is limited by engagement of the arm 22 with the annular boss or projection 31 of the crank arm 26. It will also be observed that the bearings 16 are formed integral with the sections of the casing or housing while the discharge nozzle 32 depends from and is formed integral with the section 8. A recess or opening 33 is preferably formed in the flange 14 and adapted to register with a vent tube or opening 34 thereby to permit the escape of air from the compartments 18 and 19 when filling the latter with liquid.

The operation of the device is as follows: In order to draw a glass of beer from the containing vessel 5 the operator depresses the handle 17 in the direction indicated by the arrow in Fig. 2 of the drawings, thereby rotating the valve 13 and closing the discharge port 10. When the handle 17 is depressed the valve will be rotated within the casing until the port 20 registers with the intake port 11 and in which position the beer or other liquid from the receptacle 5 is free to flow through the coupling 11 and depressions 21 into the compartments 18 and 19 which latter are preferably of sufficient size to contain a single glass of beer, as before stated. As the handle 17 is moved downwardly the arm 22 of said handle will be forced upwardly and engage the crank 26 and thus actuate the registering mechanism to indicate on the dial 28 the quantity of beer withdrawn from the containing vessel. As soon as the operating handle 17 is moved to vertical or normal position the port 20 will register with the discharge port 10 in the casing and thereby permit the beer in the compartments 18 and 19 to be discharged through the nozzle 10 into a glass or other receptacle adapted to receive the same. When the pressure on the actuating arm 26 is removed the spring 30 will force the arm downwardly into engagement with the stop lug 29 so that the arm will be in position to indicate the withdrawal of another glass of beer when the operating lever is again operated.

By making the casing or housing in sections detachably secured together, the latter may be readily taken apart so as to permit the interior of the faucet to be conveniently cleaned. While the faucet is principally designed for dispensing a single glass of beer at each movement of the operating lever, it is obvious that the faucet may be made larger or smaller so that any desired quantity of liquid may be withdrawn from the receptacle at each operation of the device.

Having thus described the invention what is claimed is:

1. A measuring faucet including a casing provided with intake and discharge ports, a valve mounted for rotation within the casing and dividing the latter into liquid compartments, said valve being provided with an opening adapted to register with the ports, a handle for operating the valve and registering mechanism disposed in the path of movement of the handle and actuated by the latter.

2. A measuring faucet including a sectional casing provided with intake and discharge ports, a disk mounted for rotation in the casing and provided with a peripheral flange bearing against the interior walls of the casing and having an opening formed therein adapted to register with said ports, a handle for rotating the valve and provided with a laterally extending arm, and registering mechanism disposed in the path of movement of the arm and actuated by the latter.

3. A measuring faucet including a casing provided with intake and discharge ports, a valve mounted for rotation within the casing and dividing the latter into liquid compartments, said valve being provided with a peripheral flange having an opening formed therein and adapted to register with the ports in the casing, said opening permitting the entrance of the liquid to and the discharge of said liquid from both compartments, an operating handle for rotating the valve, and registering mechanism disposed in the path of movement of the handle and operated by the latter.

4. A measuring faucet including a casing provided with intake and discharge ports, a rotary valve dividing the casing into a plurality of liquid compartments and provided with a peripheral flange having an opening formed therein adapted to register with the ports in the casing, there being depressions formed in the valve at the opening in the flange, an operating handle for rotating the valve, and registering mechanism disposed in the path of movement of the operating handle.

5. A measuring faucet including a sectional casing provided with intake and discharge ports, a disk dividing the casing into a plurality of liquid compartments, a flange formed on the periphery of the disk and constituting a valve, said flange being provided with an opening adapted to register with the ports in the casing thereby to permit the entrance of the liquid to and the discharge of the liquid from both compartments, an operating handle for rotating the valve, and registering mechanism disposed in the path of movement of the handle and actuated by the latter.

6. A measuring faucet including a casing and provided with intake and discharge ports, a shaft journaled in the casing, a disk secured to the shaft and forming in connection with the casing a plurality of liquid containing compartments, a flange secured to the disk and having an opening formed therein and adapted to register with the ports in the casing, said flange being disposed in contact with the interior walls of the casing and constituting a valve, and an operating handle secured to the shaft.

7. A measuring faucet including a casing provided with intake and discharge ports, a shaft journaled in the casing, a disk secured to the shaft and forming in connection with the casing liquid receiving compartments, a flange on the disk and having an opening therein and adapted to register with the ports in the casing, there being depressions formed in the disk at said opening to permit the discharge of the liquid in the compartment when said openings register with the discharge port in the casing, and means for operating the shaft.

8. A measuring faucet including a casing formed of a plurality of sections detachably secured together, said casing being provided with intake and discharge ports, a shaft journaled in the walls of said casing, a disk secured to the shaft and provided with a marginal flange having an opening formed therein adapted to register with the ports in the casing, and a handle for operating the valve.

9. A measuring faucet including a casing provided with intake and discharge ports, a valve mounted for rotation in the casing and adapted to register with said ports, registering mechanism provided with an actuating crank having an extension formed thereon, a lever for rotating the shaft and adapted to engage the crank of the registering mechanism for actuating the crank, the movement of the lever and valve being limited by engagement of the handle with the extension on the actuating crank of the registering mechanism.

10. The combination with a containing vessel, of a registering faucet including a casing provided with intake and discharge ports, a coupling connecting the casing with the containing vessel, a disk mounted for rotation within the casing and provided with a peripheral flange having an opening formed therein and adapted to register with the ports in the casing, registering mechanism secured to the coupling member and provided with an actuating arm, and an operating lever for rotating the disk and adapted to engage the operating arm of the registering mechanism for operating the latter.

In testimony that I claim the foregoing as my own, I have hereto affixed my signature in the presence of two witnesses.

NICHLS. HORON.

Witnesses:
S. BRUCE CHASE,
ALLEN L. BUSKIRK.